US010161503B2

(12) United States Patent
Taylor et al.

(10) Patent No.: US 10,161,503 B2
(45) Date of Patent: Dec. 25, 2018

(54) PLANETARY GEAR CARRIER JOINT FOR PRECISION RE-ASSEMBLY AND TORQUE TRANSMISSION

(71) Applicants: Alan C. Taylor, Lake Orion, MI (US); Jeffrey W. Lemke, St. Thomas (CA)

(72) Inventors: Alan C. Taylor, Lake Orion, MI (US); Jeffrey W. Lemke, St. Thomas (CA)

(73) Assignee: GKN Sinter Metals, LLC, Auburn Hills, MI (US)

(*) Notice: Subject to any disclaimer, the term of this patent is extended or adjusted under 35 U.S.C. 154(b) by 526 days.

(21) Appl. No.: 14/781,619

(22) PCT Filed: Apr. 9, 2014

(86) PCT No.: PCT/US2014/033487
§ 371 (c)(1),
(2) Date: Oct. 1, 2015

(87) PCT Pub. No.: WO2014/169033
PCT Pub. Date: Oct. 16, 2014

(65) Prior Publication Data
US 2016/0061315 A1 Mar. 3, 2016

Related U.S. Application Data

(60) Provisional application No. 61/810,961, filed on Apr. 11, 2013, provisional application No. 61/825,823, filed on May 21, 2013.

(51) Int. Cl.
*F16H 57/08* (2006.01)

(52) U.S. Cl.
CPC ................ *F16H 57/082* (2013.01)

(58) Field of Classification Search
CPC ..................................... F16H 57/082
See application file for complete search history.

(56) References Cited

U.S. PATENT DOCUMENTS

| 2,239,973 A | 4/1941 | Ravigneaux |
| 3,527,121 A | 9/1970 | Moore |

(Continued)

FOREIGN PATENT DOCUMENTS

| CN | 1726358 A | 1/2006 |
| JP | S62200808 U | 12/1987 |

(Continued)

OTHER PUBLICATIONS

PCT International Search Report and Written Opinion dated Sep. 16, 2014, in connection with PCT/US2014/033487.

(Continued)

*Primary Examiner* — Derek D Knight
(74) *Attorney, Agent, or Firm* — Quarles & Brady LLP

(57) ABSTRACT

A planetary gear carrier has a drum cover and drum hub that make up a drum of the carrier and a carrier plate spaced from the drum cover defining a space in which the planetary gears reside, The drum cover, drum hub and carrier plate are joined by keys that are formed integrally with at least one of them that mate with surfaces of the other parts for precise assembly and re-assembly, and windows are defined through sets of spline teeth of the dram cover and drum hub through which planetary gears may be inserted for assembly to the carrier while the drum cover, drum hub and carrier plate are assembled to one another.

36 Claims, 16 Drawing Sheets

(56) References Cited

U.S. PATENT DOCUMENTS

| | | | |
|---|---|---|---|
| 3,842,481 A | 10/1974 | Laing | |
| 7,214,160 B2 * | 5/2007 | Illerhaus | F16H 57/082 |
| | | | 475/331 |
| RE41,313 E * | 5/2010 | Simon | F16H 3/663 |
| | | | 475/340 |
| 2002/0170161 A1 | 11/2002 | Cadle et al. | |

FOREIGN PATENT DOCUMENTS

| | | |
|---|---|---|
| JP | H08 189493 A | 7/1996 |
| JP | H11210867 A | 8/1999 |
| JP | 2005299877 A | 10/2005 |
| WO | 2007081715 A2 | 7/2007 |

OTHER PUBLICATIONS

The State Intellectual Property Office of the People's Republic of China, Application No. 201480020622.9, First Office Action and Search Report, dated Jun. 2, 2017.
Japan Patent Office, Notification of Reason for Refusal, Application No. 2016-507633, dated Jan. 30, 2018, 6 pages.
The State Intellectual Property Office of the People's Republic of China, Second Office Action, Application No. 201480020622.9, dated Feb. 5, 2018, 12 pages.
China National Intellectual Property Administration, Third Office Action and Search Report, Application No. 201480020622.9, dated Sep. 5, 2018, 13 pages.

* cited by examiner

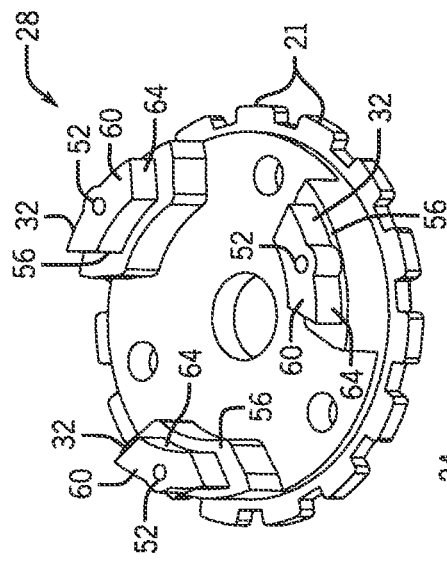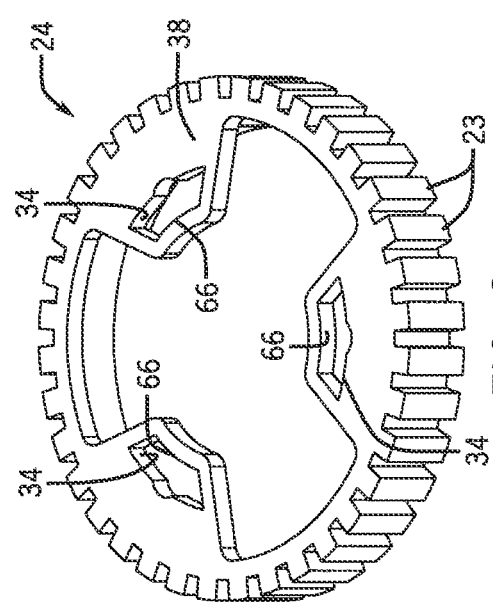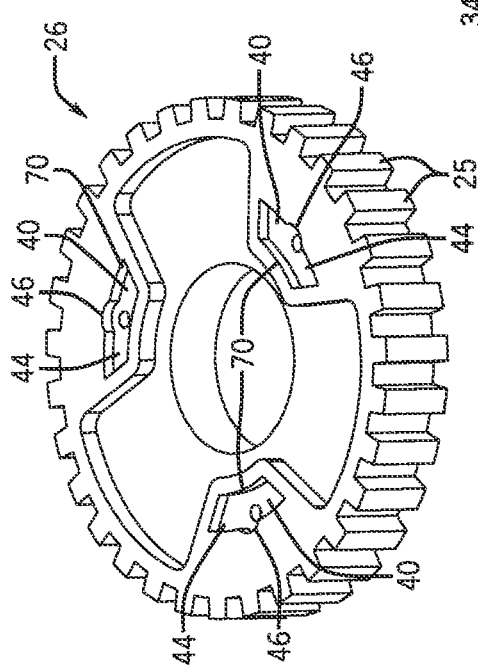

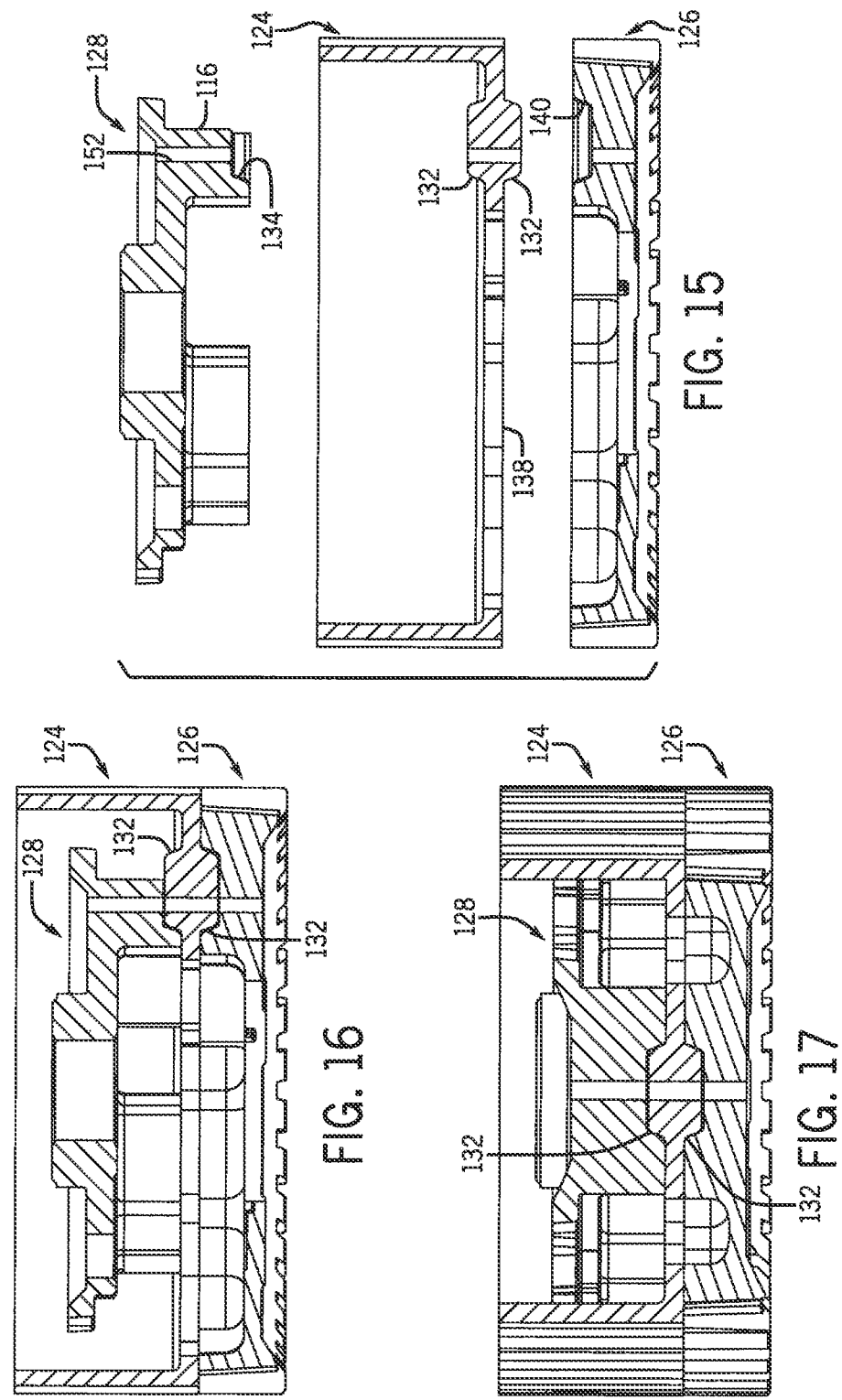

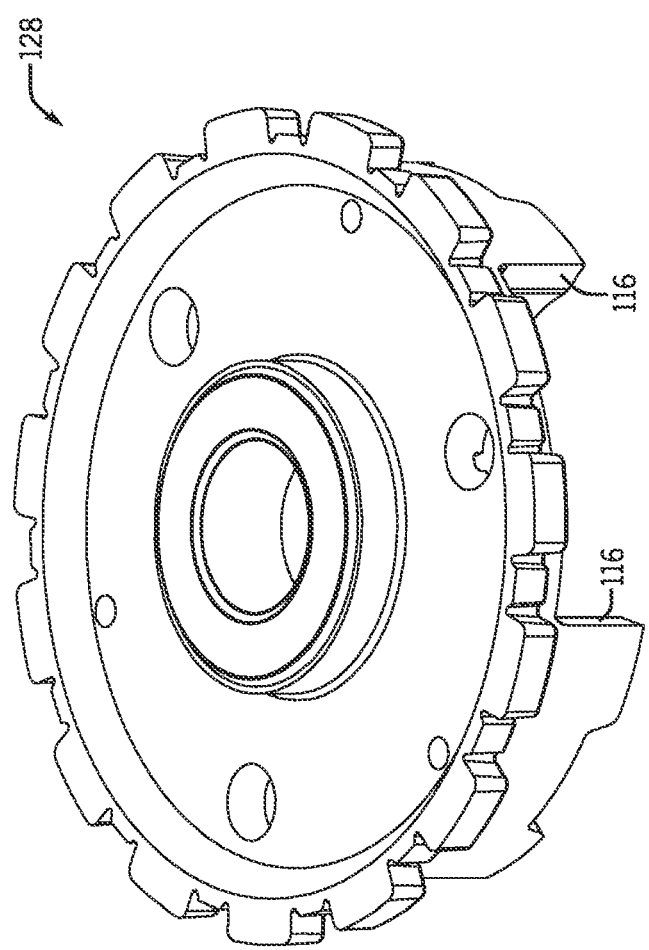

PLANETARY GEAR CARRIER JOINT FOR PRECISION RE-ASSEMBLY AND TORQUE TRANSMISSION

CROSS-REFERENCE TO RELATED APPLICATIONS

This application represents the national stage entry and claims the benefit of PCT International Application No. PCT/US2014/033487 filed Apr. 9, 2014, which claims the benefit of U.S. Provisional Patent Application No. 61/810,961 filed Apr. 11, 2013 and U.S. Provisional Patent Application No. 61/825,823 filed May 21, 2013, the entire disclosures of which are incorporated by reference here in their entirety for all purposes.

STATEMENT CONCERNING FEDERALLY SPONSORED RESEARCH OR DEVELOPMENT

Not applicable.

FIELD OF THE INVENTION

This relates to joining of parts in a manner that can be disassembled and re-assembled with precision and facility, as is necessary for example when the parts are machined assembled and then must be disassembled and re-assembled with the machined surfaces of the parts precisely located relative to one another, and in particular for torque transmitting parts that are put together in a multi-part assembly.

BACKGROUND OF THE INVENTION

This invention relates to machined component assemblies such as planetary gear carriers for automatic transmissions. In such assemblies, commonly two parts adapted to support planetary gears between them are put together into an assembly, are machined as assembled and thereafter are disassembled for additional components to be added (shafts, planetary gears, etc.) or processes to be performed while disassembled and then the parts are re-assembled. Upon re-assembly, the machined surfaces must be located relative to one another in the precise location in which they were machined prior to disassembly.

In the typical construction, a drum part has two splines, like gear teeth, on its outer perimeter. Placing both sets of splines on one monolithic component facilitates torque transfer, but makes it relatively difficult to manufacture.

SUMMARY OF THE INVENTION

The invention provides for separating a construction, such as a planetary gear carrier, typically found in a single part into multiple parts while still permitting precision re-assembly of the parts after machining or other processes are performed.

A locating key in the multi-part construction that mates in an interference fit or plastically deforms or is deformed by at least two of the parts when they are initially assembled is provided that assures that the parts will be reassembled in precisely the same relative position. The key may be provided as a separate part, or may be integral with one of the parts. In a component subjected to torque from one part to another, the torque is transmitted through the key. One or more of the parts may be powder metal, which may be sintered or sinter forged powder metal, and one or more of the other parts may be another material, such as aluminum, for example. The key may be a harder material and the receivers (the parts deformed by the key) may be a softer material, or vice versa. However, a tight fit, or even plastic deformation, caused by one of the parts to the other part or parts should occur when the parts are assembled together, so that when they are disassembled and then re-assembled, the deformed surfaces will receive the surfaces that deformed them with precision. To facilitate this, deforming ribs may be added to one of the interfitting components that bite into the other component to assure precision upon reassembly.

In addition, windows may extend through the sets of teeth or splines that facilitate assembly of planet gears to the carrier with the three main parts of the carrier assembled. The windows may be defined by edge openings in two or more of the three parts.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

FIG. 3 is a perspective view of a drum hub part incorporating aspects of the invention;

FIG. 4 is a perspective view of a carrier plate incorporating aspects of the invention for fitting with the drum hub of FIG. 3;

FIG. 5 is a perspective view of a drum cover incorporating aspects of the invention for fitting with the drum hub of FIG. 3 and the carrier plate of FIG. 4 to make a planetary gear carrier assembly;

FIGS. 15-25 are views of an alternate embodiment of a three piece planetary gear carrier with keys formed as part of the drum hub, like the schematic of FIG. 10;

DETAILED DESCRIPTION OF THE PREFERRED EMBODIMENT

The invention provides a joining method and construction in which one part, which may be powder metal, has keys that are coaxially located to afford joining of parts of an assembled component. The parts can be powder metal or a mixture of powder metal parts and other parts, for example, aluminum. The joint may have the key incorporated into one of the parts or be provided with the key as a separate element. The keys are precisely designed to allow accurate positional fixing to the other parts of the assembly, which is repeatable when the parts are disassembled and re-assembled. The keys are also capable of transmitting torques in torque transmission applications. A typical use would be an automatic transmission planetary gear carrier that has coaxial splines. A problem to which the invention is directed is the need to join three or more pieces together but allow the pieces to be disassembled and re-assembled with precision. Typically, such parts are assembled and machined with the machining, for example line boring, going through multiple parts. Then the parts are disassembled, for example to assemble additional parts to them, like shafts and planetary pinions, and are re-assembled. When re-assembled, the common holes or other machined surfaces that were machined in a single line boring or other machining operation must be co-axially and precisely located relative to one another. In addition, such parts might have splines on the outside of them, and different sets of splines on the outside of them, which must be aligned with one another angularly and co-axially and precisely positioned relative to one another in all three dimensions. In addition, the joint must provide adequate assembly strength for example in an automatic transmission carrier as torques are transmitted between the multiple sets of splines on the carrier.

Figure 1:
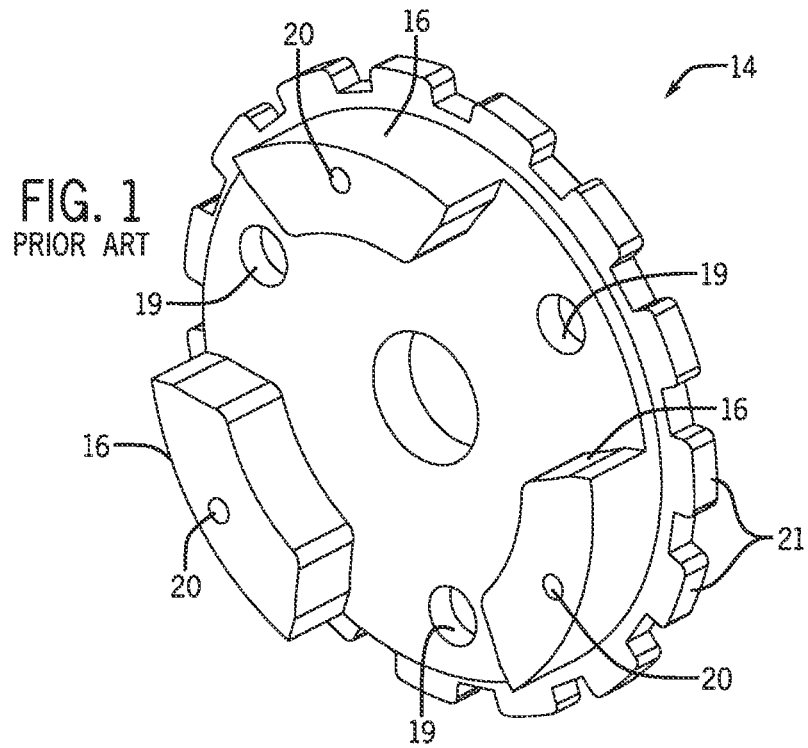
FIG. 1 is a perspective view of a first carrier plate of a prior art planetary gear carrier for an automatic transmission.
Figure 2:
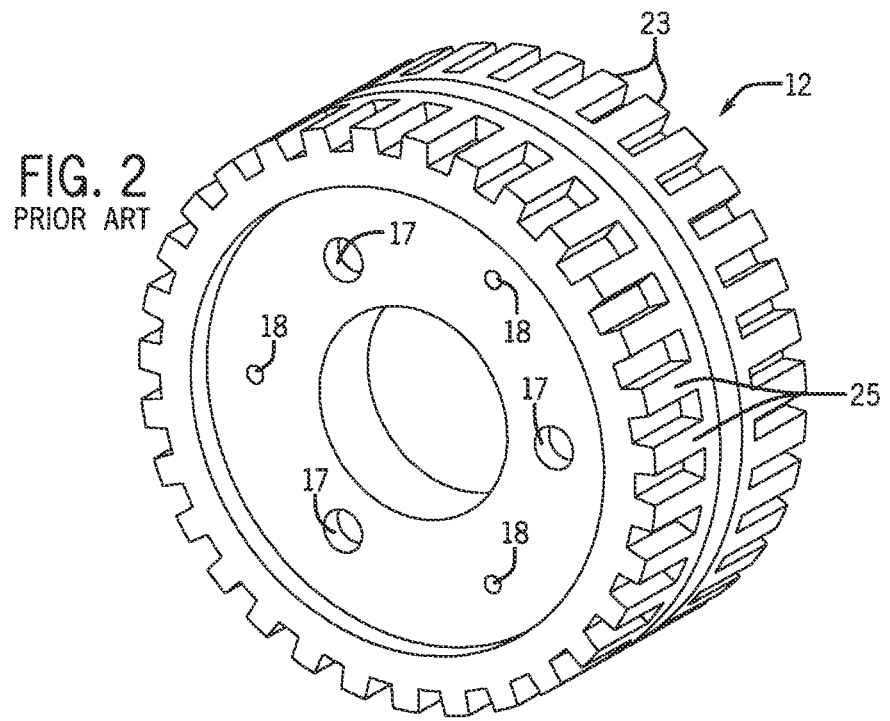
FIG. 2 is a perspective view of a drum for the prior art planetary gear carrier including the plate of FIG. 1.

FIGS. 1 and 2 show parts of a conventional carrier, including a drum 12 and a carrier plate 14. The drum 12 is assembled over the lugs 16 of the plate 14 with holes 18 of drum 12 lining up with respective threaded holes 20 of plate 14 and bolts inserted through the holes 18 into the holes 20 and threaded therein so as to secure the two pieces together. Pinion shaft holes 17 are in the drum 12 with a corresponding set of pinion shaft holes 19 in the plate 14 into which pinion shafts (not shown) are assembled that support three planetary pinion gears (not shown) between the flange 13 of the drum 12 and the plate 14, in the spaces between the lugs 16. There is one external spline on plate 14 indicated by teeth 21, which continue all of the way around the periphery and two splines on the drum 12 indicated by the respective teeth 23 and 25, both of which continue all of the way around the periphery.

In the construction of a planetary gear carrier of FIGS. 3-5, the drum 12 is separated into two components, the drum intermediate component 24 of FIG. 3, and the drum cover 26 of FIG. 5 and features are provided on the two components that incorporate aspects of the invention. The carrier plate 28 shown in FIG. 4 is also modified to incorporate aspects of the invention. Upon assembly of the three components together, the hub 24 is placed over the plate 28 with the lug extensions 32, also referred to herein as keys 32, extending through receivers 34 in drum hub 24, the receivers 34 being holes that extend through the flange 38 of the drum hub. The keys 32 extend beyond the receivers 34 of the drum hub 24 into pocket receivers 40 of the drum cover 26. The drum cover 26 is flipped over from the orientation illustrated in FIG. 5 onto the top of the drum hub 24 of FIG. 3 with the pocket receivers 40 lined up with the through hole receivers 34 and with the lug extensions 32. There is an interference fit provided between the side surfaces of the keys 32 and the receivers 34 and 40. This interference fit may be provided by providing a taper on the mating surfaces of the keys 32 and receivers 34 and 40 or by providing V-shaped ribs (parallel to and tapering in the direction of insertion) or other structures on the faces of the extensions 32 that would bite into the walls of the receivers 34 and 40 upon pressing of the plate 28 into the hub 24 and cover 26, for example as described in WO 2007/081715 A2 or in U.S. Patent Application Publication No. 2002/0170161 A1, both of which are hereby incorporated by reference as if fully set forth herein for all purposes.

Whereas the receivers 34 are through holes, the pocket receivers 40 have a bottom wall 44 through which the holes 46 extend which are analogous to the holes 18 in FIG. 2 through which the bolts extend. Therefore, bolts extend from the end of holes 46 at the opposite end from that shown in FIG. 5 through the holes 46 and into threaded holes 52 in the keys 32 to secure the three parts together.

Figure 6:
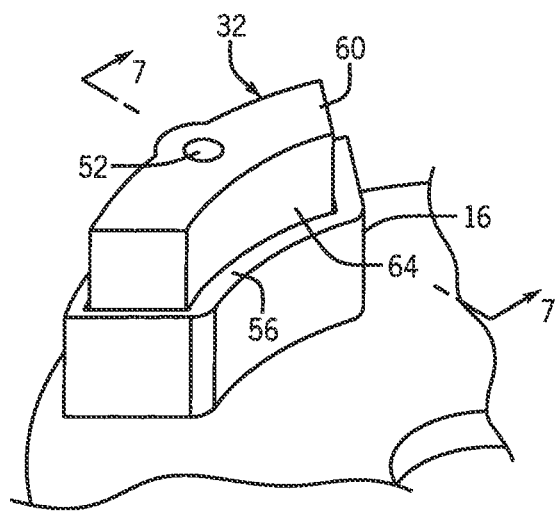
FIG. 6 is a detail perspective view of one of the lugs incorporating the invention, like one of the lugs in the carrier plate of FIG. 4.

Referring particularly to FIGS. 4 and 6, the keys 32 extend above lugs 16 and are smaller than the lugs 16 on all sides creating a ledge 56 that in the embodiment of FIG. 6 extends all the way around the key 32. The ledge 56 is at the top of the leg 16 and at the base of the key 32. The drum hub 24 may or may not bottom against the ledge 56 when all of the parts are assembled, and the surface 44 may or may not bottom against the end surface 60 of the keys 32 when the parts are assembled. For assembly precision, it is preferred that such bottoming does occur, but the fit of the sides of the keys 32 to the sides of the receivers 34 and 40 must be sufficiently tight upon insertion to counteract all forces that the assembled component may be subjected to, such as torque forces, and to assure precise re-assembly of the parts after machining and the parts are disassembled. They must remain tight through the temperature range that the assembly will be subjected, accounting for dissimilar materials and rates of thermal expansion, as would exist for example, if the plate 28 and keys 32 were an iron based powder metal and the drum hub 24 and drum hub cover 26 were aluminum. As stated above, the fit may be an interference fit, and depending on the application may need to be an interference fit that causes plastic deformation between the keys 32 and the receivers 34 and 40, and particularly between the side surfaces of the keys 32 and the side surfaces of the receivers 34 and 40 that are deformed by the keys 32 upon the initial pressing of the keys 32 into the receivers 34 and 50. These side surfaces of the keys 32 are indicated by reference numeral 64 and extend all of the way around the key 32 in FIG. 4 and mate with the facing surfaces of the receiver 34 indicated as 66 and the facing surfaces 70 of the pocket receivers 40, which also extend all of the way around the pocket receivers 40. It may also be possible to design the mating surfaces so that they do not interfere for their full peripheries.

Figure 7:
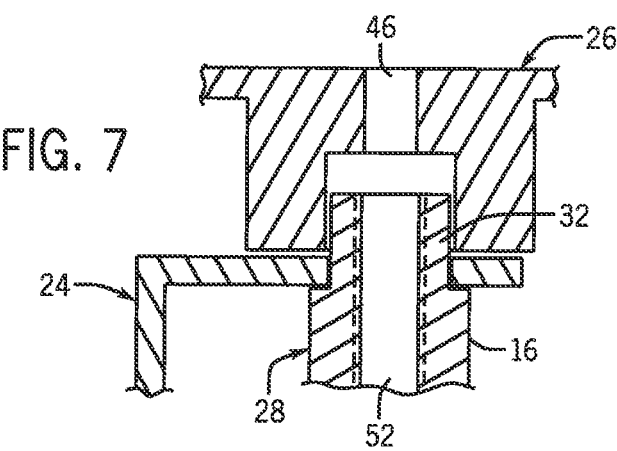
FIG. 7 is a cross-sectional view from the plane of the line 7-7 of FIG. 6 and also showing the components of FIGS. 3-5 being assembled together but without the bolt that secures them.

FIG. 7 is a cross-sectional view from the plane of the line 7-7 of FIG. 6 illustrating generally the relationship of the parts. Although spaces are shown for drawing clarity between the key 32 and the receivers, it should be understood that such spaces would not exist with an interference fit.

Figure 8:
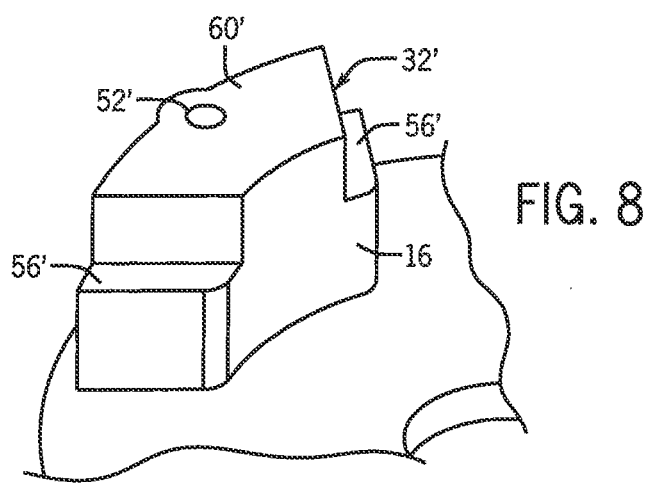
FIG. 8 is a view like FIG. 6 but of an alternate embodiment of the lug.

FIG. 8 illustrates an alternate construction for the keys 32, identified as key 32' in which the step surface 56' is only at the ends of the key 32' and not along its inner and outer sides. In this embodiment, the key 32' is the full width of the lug 16 which provides more strength for radial location and torque transmission.

Figure 9:
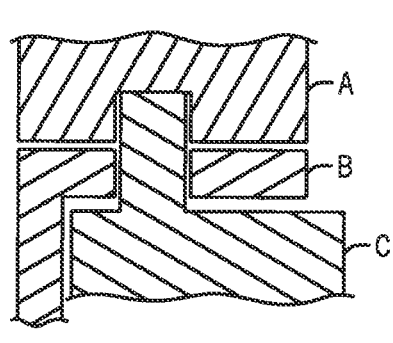
FIG. 9 is a schematic depiction of the assembly of FIG. 9 (bolt hole not shown)
Figure 10:
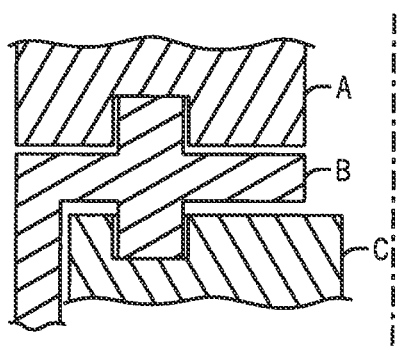
FIG. 10 is a schematic depiction like FIG. 9 but of an alternate embodiment.
Figure 11:
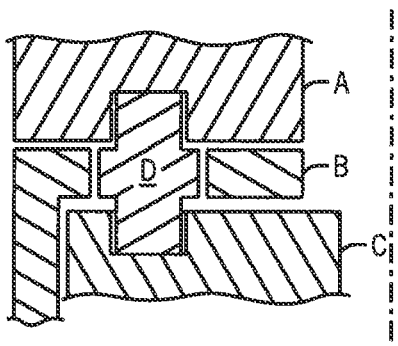
FIG. 11 is a schematic depiction like FIGS. 9 and 10 but of another alternate embodiment.

For ease of understanding, FIGS. 9-11 illustrate alternate configurations for the key 32 in schematic representation without showing the holes 52. Also, as indicated above, the fact that there are spaces between the lines delineating the keys and the mating parts does not mean that there are actually open spaces there. Instead, there would be an interference fit across the majority of the surface or portions of the two surfaces would actually interfere to the point that there was plastic deformation of one or the other surface. For example, the key or the component that the key is part of may typically be made of an iron based powder metal and the other two or three components may be made of a softer material such as aluminum. That being the case, the powder metal component bearing the key or the key itself if provided as a separate component would bite into or otherwise plastically deform the mating surfaces of the aluminum components.

FIG. 9 is a schematic representation of the embodiment of FIG. 7. FIG. 10 is a representation like FIG. 9, but with the key provided as part of the intermediate component (the drum hub 24), rather than as part of the third component (the carrier plate 28). In FIG. 10, the intermediate component is denoted Part B, which would preferably be a harder material such as powder metal, with Parts A and C being the softer material such as aluminum, which would be deformed by the keys formed as part of Part B fitting into the receivers which are formed in the respective Parts A and C. In the embodiment of FIG. 10, as applied to a planetary gear carrier, the keys extend from both sides of the plate or flange of the drum hub into appropriately-sized and shaped receivers in the drum cover on the top (Part A) and in the carrier plate (Part C).

FIG. 11 illustrates a separate key D that is separate from any of the Parts A, B, or C. Part D would interfere with all three components A, B, and C. All of FIGS. 9-11 are schematic sectional views like from the plane of the line 7-7, but without showing the bolt holes. It is noted that in the configuration of FIG. 9, the key may be provided on Part C as illustrated or on Part A with the pocket receiver in Part C. In the carrier embodiment, therefore, the key would be provided on the drum cover and the pocket receiver would be provided in the carrier plate.

Figure 12:
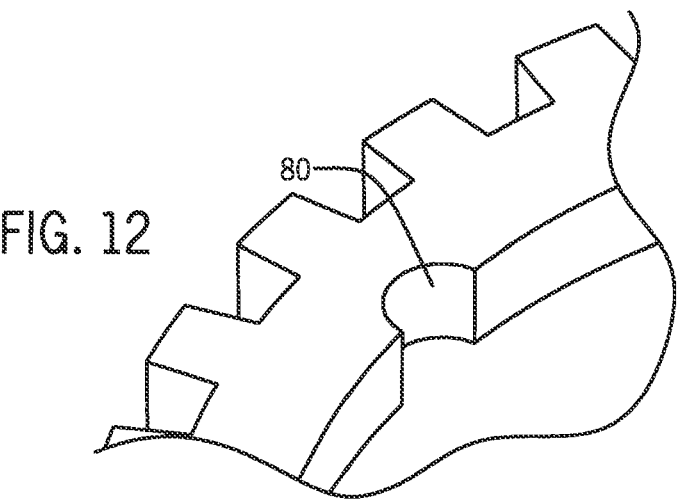
FIG. 12 is a perspective fragmentary view of a feature that can be incorporated into an assembly by applying aspects of the invention.

Referring to FIG. 12, the design of multiple pieces allows the development of co-joined geometry such as oil reservoirs 80. A second piece could be added on top to produce a well. Thereby, the reservoir 80 can be formed during the powder metal compaction step in the sintering process.

Figure 13:
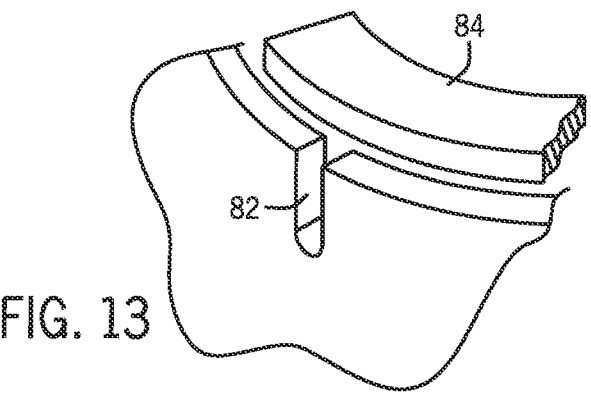
FIG. 13 is another example of a feature that can be incorporated into an assembly by applying aspects of the invention.
Figure 14:
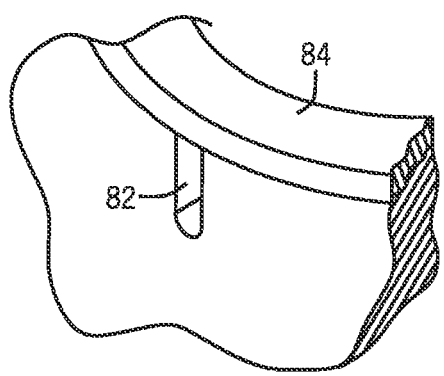
FIG. 14 is like FIG. 13 with the parts shown there assembled.
Figure 19:
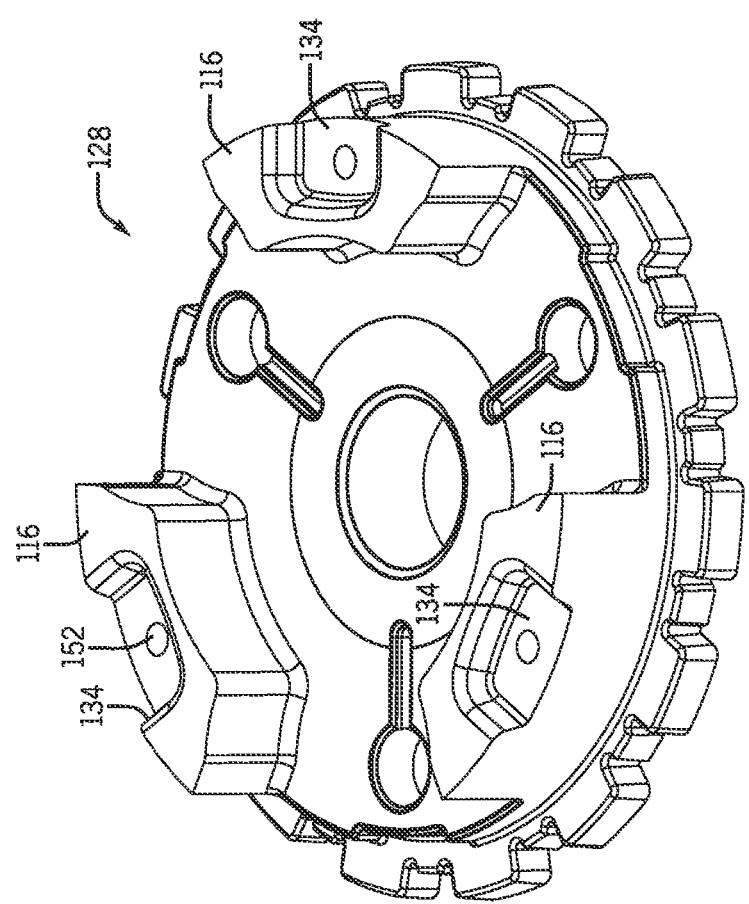
Figure 20:
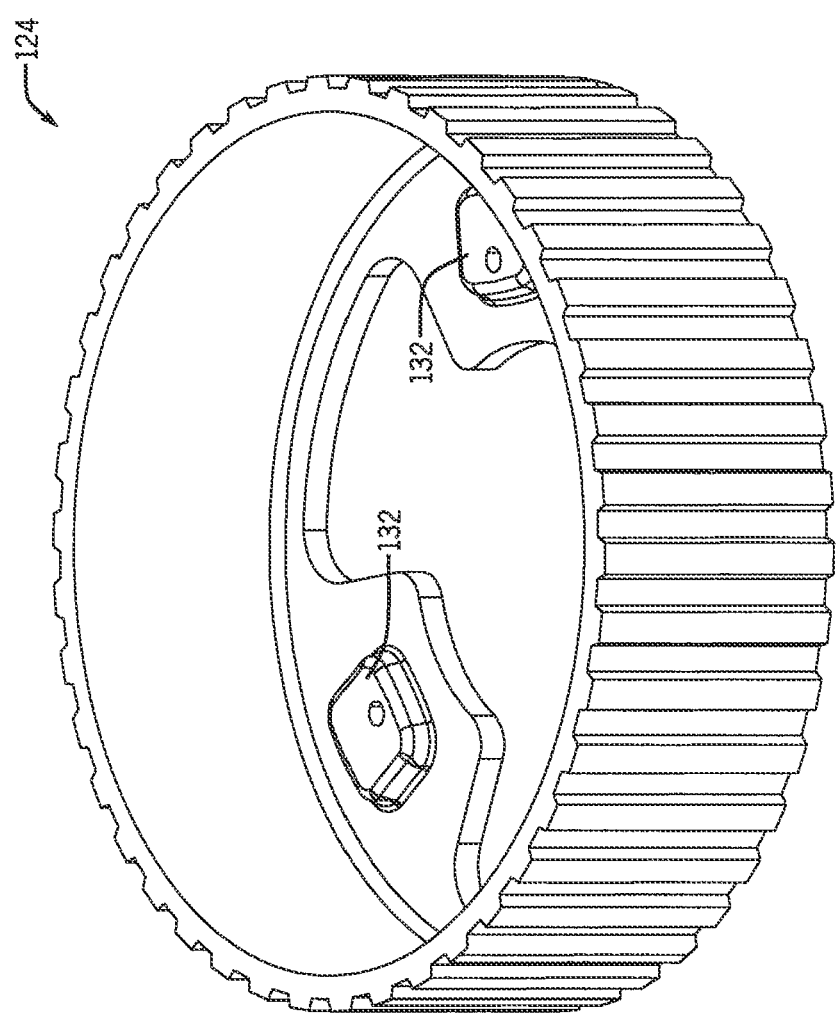
Figure 21:
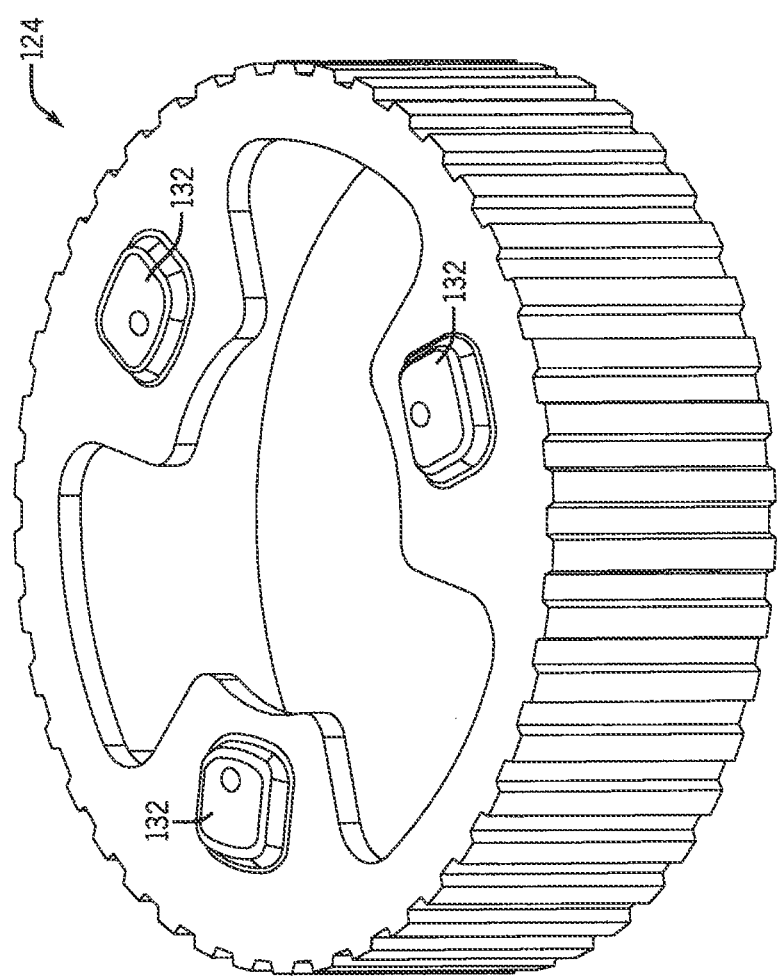
Figure 22:
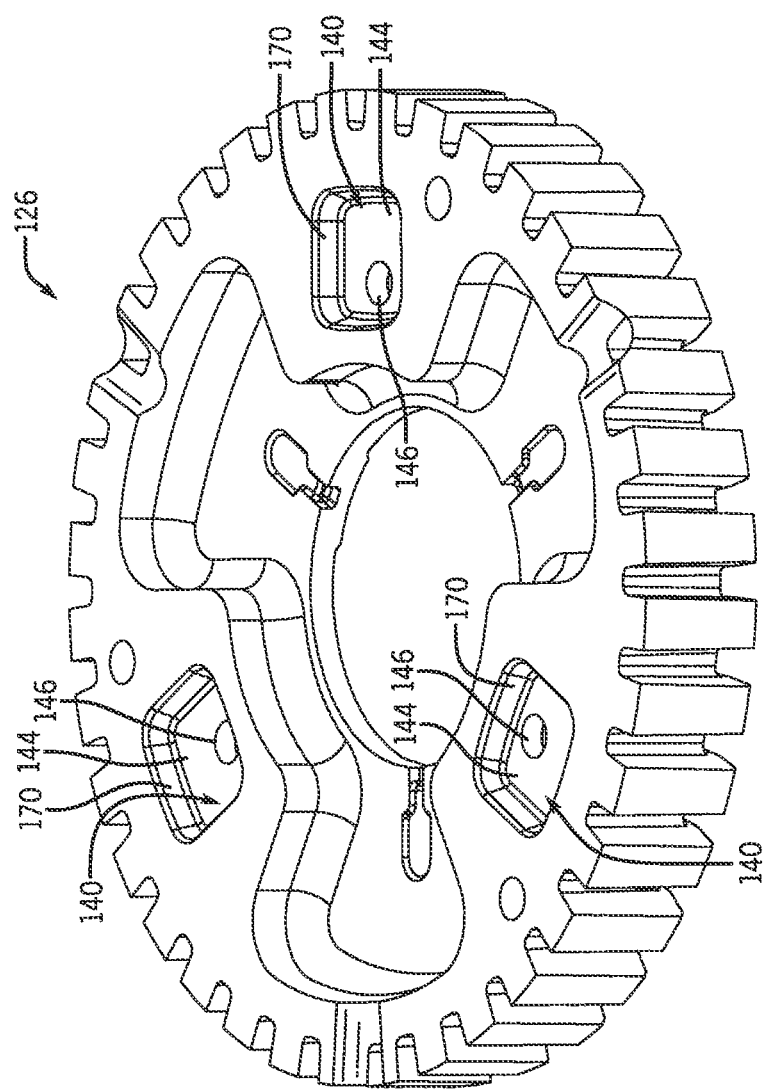
Figure 23:
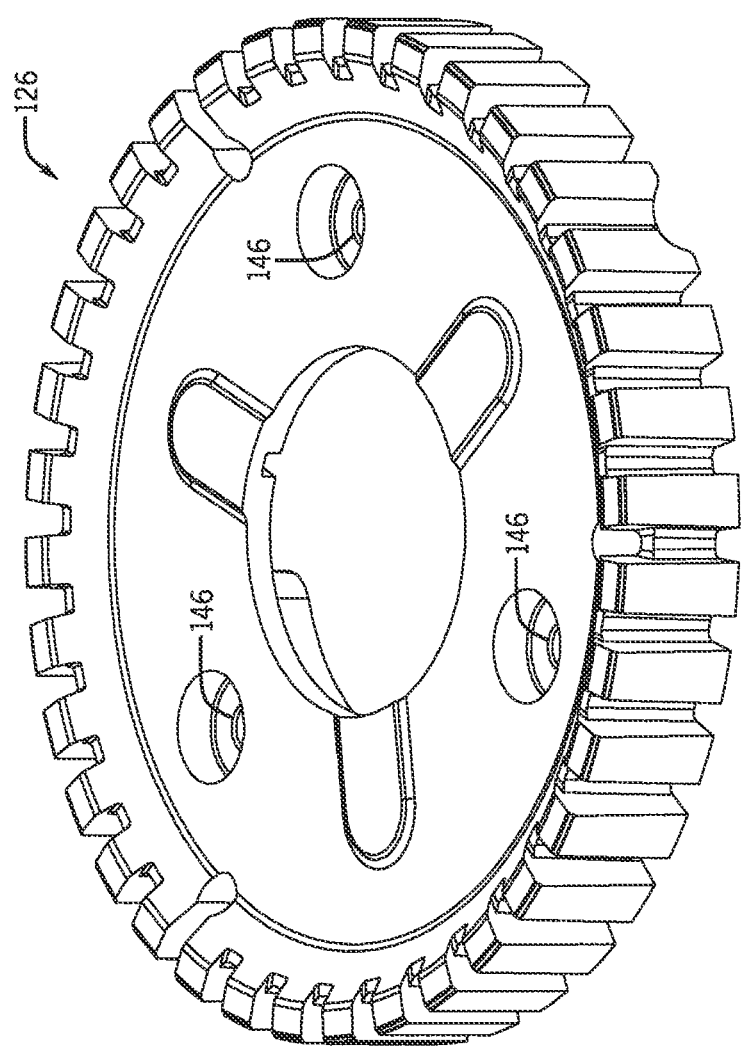
Figure 24:
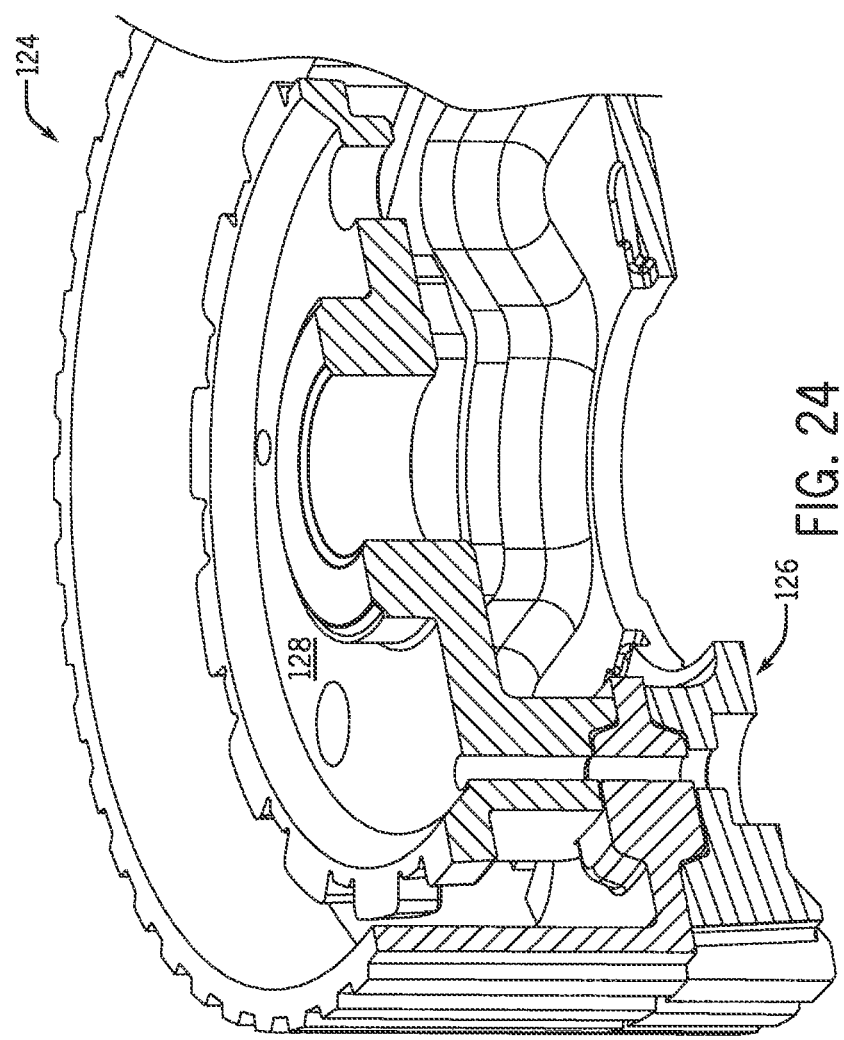
Figure 25:
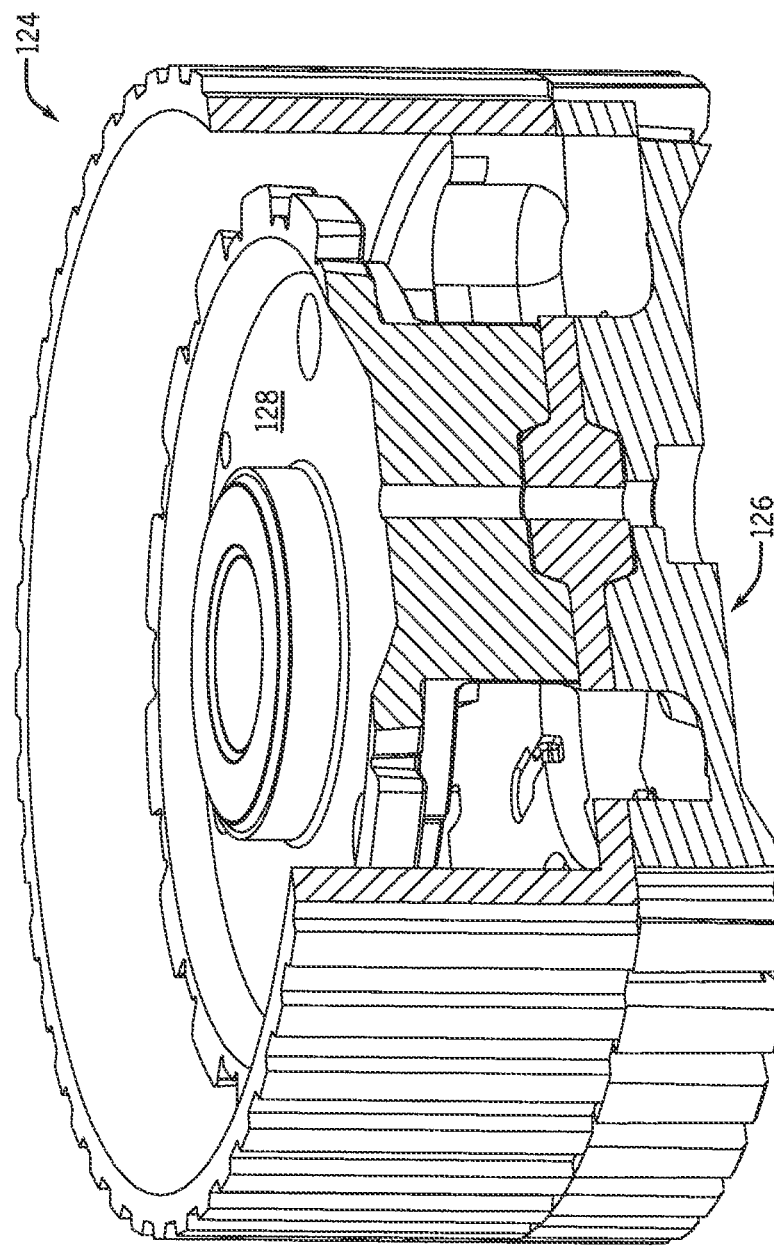

Referring to FIGS. 13 and 14, another example of an advantage with using multiple pieces in such an application is that they allow the development of cross-hole slots for fabrication or other functions. FIG. 13 illustrates a cross-hole slot 82 at an end of a circular part. This can also be formed during a powder compaction process. When a top piece 84 is added as illustrated in FIG. 14, a slotted hole results allowing use of the hole as a lubricant or other feature, such as an access slot.

FIGS. 15-25 illustrate an alternate embodiment of a three piece planetary gear carrier 100 with keys 132 formed as part of the drum hub 124, like the schematic of FIG. 10. Elements corresponding to elements in the embodiment of FIGS. 3-5 are labeled with the same reference number plus 100.

Figure 26:
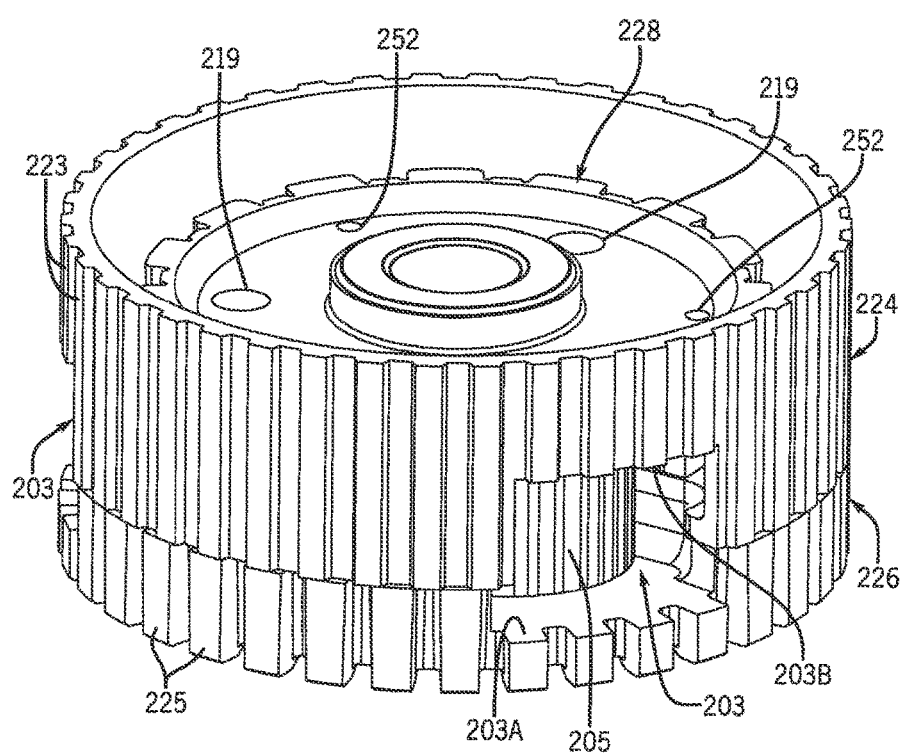
FIG. 26 is a top perspective view of an alternate embodiment like the embodiment of FIGS. 15-25 but having windows for assembling internal planetary gears to the carrier with the three main parts of it assembled together.
Figure 27:
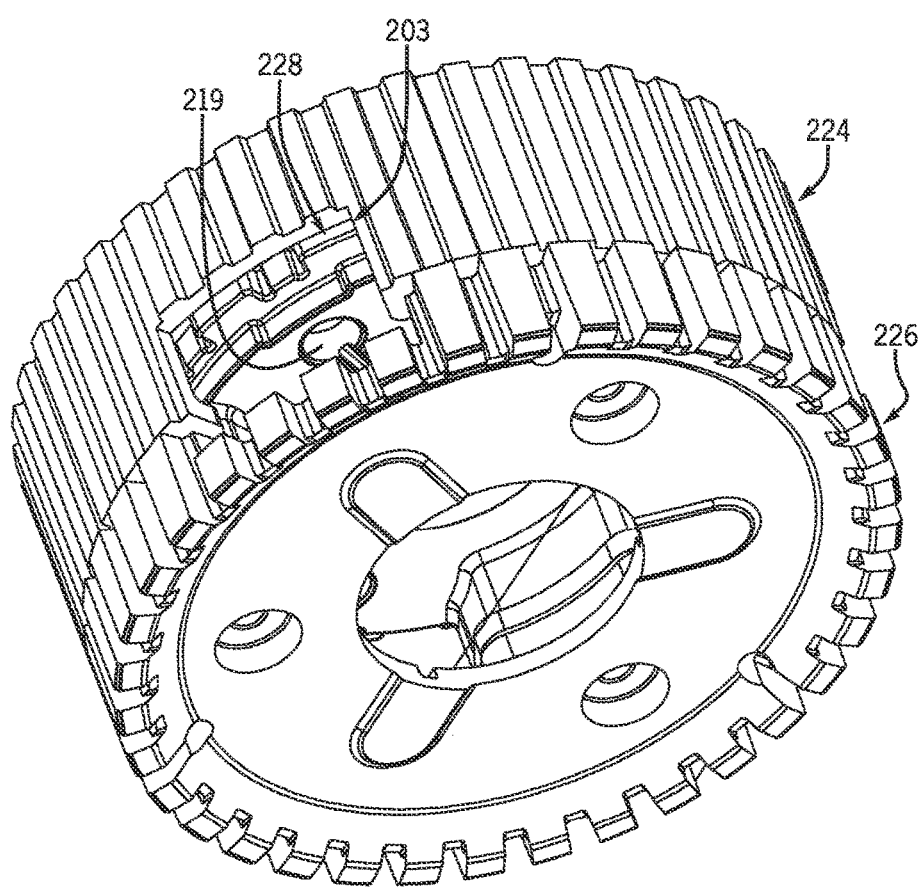
FIG. 27 is a bottom perspective view of the embodiment of FIG. 26.

FIG. 26 applies the advantages provided by the keyed assembly of the three mating parts (drum cover 226, drum hub 224 and carrier plate 228) of the carrier by providing windows 203 in the two parts 226 and 224 that make up the drum. A pinion gear 205 may be inserted through each window 203 after the three parts 224, 226 and 228 are assembled together (by bolting, riveting, brazing or welding) without disassembling the three parts. Elements corresponding to elements in the embodiment of FIGS. 3-5 are labeled with the same reference number plus 200. There are typically three such windows 203 provided around the two part drum, equiangularly spaced apart, to receive the respective three planet gears 205. Each planet gear 205 may be secured by inserting a shaft (not shown) down through the coaxial hole 219 in the carrier plate, through the gear 205 and into recesses (or holes) in the drum cover 226. The shaft may be secured axially by any suitable means, for example by a pin through the gear and shaft or by an E clip. The embodiment of FIG. 26 may be provided with all of the features of the previously described embodiments, and may be made just like the embodiment of FIGS. 15-25, except with the windows 203 as described.

Each window 203 is provided with one side portion 203A of the window in the drum cover 226 and the other side portion 203B in the drum hub 224. As such, since each portion 203A, 203B of the window is three sided, the window portions can be formed by conventional powder metal compaction processes. The two window portions need not be the same size and in the embodiment of FIG. 26 portion 203A is more narrow in axial extent than is portion 203B. The window 203 is through both sets of teeth of the drum so that teeth span the circumference of each window portion 203A, 203B to maintain engagement between both sets of teeth 223, 225 even at the angular locations of the windows 203.

Thereby the invention provides a joint between mating parts that relies on deformability between a key and mating faces on the other parts to provide functional locking for machining steps performed with the components assembled and provide that they can be disassembled and re-assembled in precisely the same relationship in which they were machined. The joint also provides for acting as a stress carrying member, with the key shape having a geometry to provide adequate strength and necessary concentricity for the intended function, and enables the formation of windows in the drum through which the planetary gears can be assembled without disassembly of the carrier.

A preferred embodiment of the invention has been described in considerable detail. Many modifications and variations to the preferred embodiment described will be apparent to a person of ordinary skill in the art. Therefore, the invention should not be limited to the embodiment described.

We claim:
1. A joint for joining three or more parts of an assembly, comprising:
a key presenting mating surfaces parallel to a direction of insertion, the key being formed integral with a first part;
a second part having formed therein a first receiver hole through which the key extends in an interference fit, the key extending in the direction of insertion beyond the receiver hole;

a third part having formed therein a second receiver hole into which the key extends in the direction of insertion in an interference fit;

wherein the key provides for disassembly after initial assembly and re-mating of the key to the receivers upon re-assembly of the key and parts with upon re-assembly the key and parts in their relationships established upon initial assembly.

2. A joint as claimed in claim 1, wherein a fastener hole is formed in the key that runs parallel to the direction of insertion.

3. A joint as claimed in claim 1, wherein the key plastically deforms walls of the receivers.

4. A joint as claimed in claim 1, wherein the key transmits torque between the first part and at least one of the other parts.

5. A joint as claimed in claim 1, wherein the assembly includes a planetary gear carrier.

6. A joint as claimed in claim 5, wherein the key is formed as part of a carrier plate of the carrier.

7. A joint as claimed in claim 5, wherein the key is formed as part of a drum cover of the carrier.

8. A joint as claimed in claim 5, wherein the key is formed as part of a drum hub of the carrier.

9. A joint as claimed in claim 1, wherein the first part is at an end of the assembly.

10. A joint as claimed in claim 1, wherein the first part is between the second and third parts of the assembly.

11. A joint as claimed in claim 1, wherein at least two of the parts define a window through them, the window being part provided in a wall of the one of the parts and part provided in a wall of the other part that defines the window.

12. A joint as claimed in claim 11, wherein the assembly is a planetary gear carrier with one of said parts being a drum cover and another of said parts being a drum hub, and wherein one side portion of the window is defined in the drum cover and another side portion of the window is defined in the drum hub.

13. A planetary gear carrier assembly as claimed in claim 12, wherein the window interrupts teeth of the drum hub and drum cover.

14. A planetary gear carrier assembly as claimed in claim 13, wherein the window interrupts two sets of teeth.

15. A planetary gear carrier assembly as claimed in claim 14, wherein one set of teeth in on the drum cover and the other set of teeth is on the drum hub.

16. A planetary gear carrier assembly as claimed in claim 12, wherein the window is sized and positioned to provide insertion of a planetary gear through the window during assembly of the planetary gear carrier.

17. A joint as claimed in claim 11, wherein one of the parts is a drum cover and the key is formed as part of the drum cover.

18. A joint as claimed in claim 11, wherein one of the parts is a drum hub and the key is formed as part of the drum hub.

19. A joint as claimed in claim 11, wherein one of the parts is a carrier plate and the key is formed as part of the carrier plate.

20. A joint as claimed in claim 11, wherein the first part is between the second and third parts of the assembly.

21. A joint as claimed in claim 1, further comprising an oil reservoir formed in one of the parts.

22. A joint as claimed in claim 1, further comprising a cross slot formed in one of the parts.

23. A joint for joining three or more parts of an assembly, comprising:

a key presenting mating surfaces parallel to a direction of insertion;

a first part having a first receiver hole into which the key extends in an interference fit along an insertion axis;

a second part having formed therein a second receiver hole in which the key is received in an interference fit and beyond which the key extends in opposite directions along the insertion axis;

a third part having formed therein a third receiver hole into which the key extends along the insertion axis in an interference fit;

wherein the key provides for disassembly after initial assembly of the three parts and re-mating of the key to the receivers upon re-assembly of the key and parts with upon re-assembly the key and parts in their relationships established upon initial assembly.

24. A joint as claimed in claim 23, wherein a fastener hole is formed in the key that runs parallel to the insertion axis.

25. A joint as claimed in claim 23, wherein the key plastically deforms walls of the receivers.

26. A joint as claimed in claim 23, wherein the key transmits torque between the parts.

27. A joint as claimed in claim 23, wherein the assembly includes a planetary gear carrier.

28. A joint as claimed in claim 27, wherein the key is separate from a carrier plate, a drum hub and a drum cover of the planetary gear carrier.

29. A joint as claimed in claim 23, further comprising an oil reservoir formed in one of the parts.

30. A joint as claimed in claim 23, further comprising a cross slot formed in one of the parts.

31. A planetary gear carrier assembly, comprising:
a drum including:
a drum cover; and
a drum hub;
wherein the drum hub and drum cover together define a generally cylindrical periphery of the drum;
a carrier plate assembled in relationship to the drum so as to be adjacent to the drum hub; and
at least one key formed integrally with at least one of the drum cover, the drum hub and the carrier plate that locates the drum cover, drum hub and carrier plate relative to one another;
wherein windows are defined through the cylindrical periphery of the drum.

32. A planetary gear carrier assembly as claimed in claim 31, wherein one side portion of the window is defined in the drum cover and another side portion of the window is defined in the drum hub.

33. A planetary gear carrier assembly as claimed in claim 31, wherein the window interrupts teeth of the cylindrical periphery.

34. A planetary gear carrier assembly as claimed in claim 33, wherein the window interrupts two sets of teeth of the cylindrical periphery.

35. A planetary gear carrier assembly as claimed in claim 34, wherein one set of teeth in on the drum cover and the other set of teeth is on the drum hub.

36. A planetary gear carrier assembly as claimed in claim 35, wherein the window is sized and positioned to provide insertion of a planetary gear through the window during assembly of the planetary gear carrier.

\* \* \* \* \*